(12) United States Patent
Friedrich et al.

(10) Patent No.: US 10,807,726 B2
(45) Date of Patent: Oct. 20, 2020

(54) EVACUATION ASSEMBLY ASPIRATOR

(71) Applicant: GOODRICH CORPORATION, Charlotte, NC (US)

(72) Inventors: Bruce Friedrich, Gilbert, AZ (US); Timothy C. Haynes, Prescott Valley, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 453 days.

(21) Appl. No.: 15/464,146

(22) Filed: Mar. 20, 2017

(65) Prior Publication Data
US 2018/0265205 A1    Sep. 20, 2018

(51) Int. Cl.
*B64D 25/14* (2006.01)
*F04F 5/20* (2006.01)
*F04F 5/46* (2006.01)
*F04F 5/18* (2006.01)

(52) U.S. Cl.
CPC .............. *B64D 25/14* (2013.01); *F04F 5/18* (2013.01); *F04F 5/20* (2013.01); *F04F 5/46* (2013.01)

(58) Field of Classification Search
CPC ..... B64D 25/14; F04F 5/18; F04F 5/20; F04F 5/46
See application file for complete search history.

(56) References Cited

U.S. PATENT DOCUMENTS

| | | | |
|---|---|---|---|
| 3,468,472 A | 9/1969 | Hahn | |
| 3,795,367 A | 3/1974 | Mocarski | |
| 4,671,744 A | 6/1987 | Shaffer et al. | |
| 4,718,870 A * | 1/1988 | Watts | B63H 11/02 137/829 |
| 8,967,980 B2 * | 3/2015 | Fitton | F04D 25/08 417/178 |
| 2013/0028763 A1 * | 1/2013 | Staniforth | F04D 25/08 417/423.5 |
| 2013/0028766 A1 * | 1/2013 | Staniforth | F04F 5/16 417/423.14 |

FOREIGN PATENT DOCUMENTS

| | | |
|---|---|---|
| FR | 2209413 | 6/1974 |
| GB | 2452490 | 3/2009 |
| WO | 2006047069 | 5/2006 |

OTHER PUBLICATIONS

European Patent Office, European Search Report dated Jul. 26, 2018 in Application No. 18162945.2-1004.
European Patent Office, European Office Action dated Jun. 6, 2019 in Application No. 18162945.2.

* cited by examiner

*Primary Examiner* — Philip J Bonzell
(74) *Attorney, Agent, or Firm* — Snell & Wilmer L.L.P.

(57) ABSTRACT

An aspirator may include an aspirator body that defines an annular cavity, a central channel, and an annular slit. Fluid communication between the annular cavity and the central channel may be via the annular slit. The aspirator body may include an entrainment opening through which ambient air is configured to be entrained into the central channel in response to gas flowing from the annular cavity through the annular slit and into the central channel.

3 Claims, 3 Drawing Sheets

EVACUATION ASSEMBLY ASPIRATOR

FIELD

The present disclosure relates to aircraft evacuation assemblies, and more specifically to aspirators for inflating evacuation devices.

BACKGROUND

In the event of an aircraft evacuation, evacuation assemblies, such as evacuation slides, are often deployed to help safely disembark passengers from the aircraft. Emergency evacuation slides may be used to exit an aircraft absent a jet way or other means of egress for passengers. Inflatable evacuation devices, such as aircraft evacuation slides and emergency life rafts, typically include a compressed fluid source (such as a charged gas cylinder) and an aspirator. The aspirator, working with the compressed fluid source, combines gas from the atmosphere and the fluid from the compressed fluid source to provide gas for inflating emergency evacuation devices. Aspirators are typically stored in a limited packing space with the evacuation slide within a small space in the aircraft.

SUMMARY

Disclosed herein, according to various embodiments, is an aspirator configured to move air from a proximal end of the aspirator to a distal end of the aspirator. The aspirator may include an aspirator body that defines an annular cavity, a central channel, and an annular slit. Fluid communication between the annular cavity and the central channel is via the annular slit, according to various embodiments.

In various embodiments, the aspirator body defines an entrainment opening. Ambient air may be configured to be entrained into the central channel via the entrainment opening in response to gas flowing from the annular cavity through the annular slit and into the central channel. In various embodiments, the aspirator includes a check-valve mechanism that is mounted to the aspirator body and is disposed in the entrainment opening.

In various embodiments, the annular slit circumscribes and is substantially disposed about the entrainment opening. In various embodiments, the annular cavity circumscribes and is substantially disposed about the annular slit. In various embodiments, the aspirator body includes an entrainment section having a radially inward surface that faces and defines the entrainment opening. In such embodiments, a radially outward surface of the entrainment section may face and may at least partially define the annular slit.

In various embodiments, the aspirator body includes an outer cavity housing. The outer cavity housing may transition to the entrainment section such that a radially inward surface of the outer cavity housing transitions to the radially outward surface of the entrainment section and a radially outward surface of the outer cavity housing transitions to the radially inward surface of the entrainment section. Additionally, the radially inward surface of the outer cavity housing may face and may at least partially define the annular cavity.

In various embodiments, the radially inward surface of the entrainment section converges, in a direction from the proximal end of the aspirator to the distal end of the aspirator, towards a longitudinal axis of the aspirator. In various embodiments, the aspirator body includes a central channel housing having a radially inward surface. A proximal portion of the radially inward surface of the central channel housing faces and at least partially defines the annular slit, according to various embodiments. The proximal portion of the radially inward surface of the central channel housing converges, in a direction from the proximal end of the aspirator to the distal end of the aspirator, towards a longitudinal axis of the aspirator, according to various embodiments In various embodiments, a distal portion of the radially inward surface of the central channel housing faces and defines the central channel. In various embodiments, the distal portion of the radially inward surface of the central channel housing diverges, in a direction from the proximal end of the aspirator to the distal end of the aspirator, away from the a longitudinal axis of the aspirator. According to various embodiments, a radially outward surface of the central channel housing faces and at least partially defines the annular cavity.

In various embodiments, the aspirator includes a flow straightener component, wherein the flow straightener component is mounted to the aspirator body and is disposed in the central channel. The flow straightener component may include a honeycomb structure having honeycomb cells extending in a direction substantially parallel with a longitudinal axis of the aspirator.

Also disclosed herein, according to various embodiments, is an aspirator configured to move air from a proximal end of the aspirator to a distal end of the aspirator. The aspirator may include an aspirator body defining an annular cavity, a central channel, an annular slit, and an entrainment opening. The annular slit may circumscribe and may be substantially disposed about the entrainment opening. The annular cavity may circumscribe and may be substantially disposed about the annular slit. In various embodiments, fluid communication between the annular cavity and the central channel is via the annular slit. In various embodiments, ambient air is configured to be entrained into the central channel via the entrainment opening in response to gas flowing from the annular cavity through the annular slit and into the central channel.

Also disclosed herein, according to various embodiments, is an evacuation assembly of an aircraft. The evacuation assembly includes a compressed fluid source, an inflatable evacuation device, and an aspirator having an aspirator body, according to various embodiments. The aspirator body may define an annular cavity, a central channel, and an annular slit. Fluid communication between the annular cavity and the central channel may be via the annular slit. In various embodiments, the aspirator is coupled in fluid receiving communication with the compressed fluid source and the inflatable evacuation device is coupled in fluid receiving communication with the aspirator.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
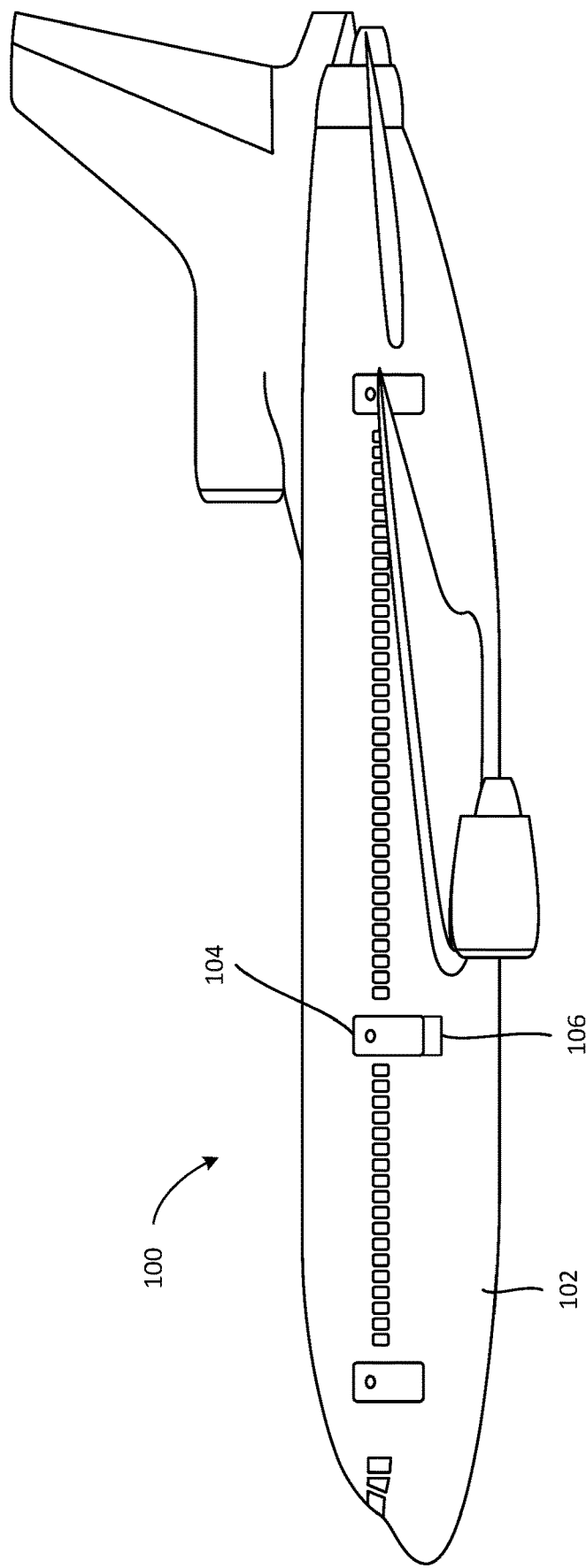
FIG. 1 illustrates a side view of an aircraft having an evacuation assembly, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The present disclosure relates to aspirators for inflatable devices, such as evacuation slides of aircraft evacuation assemblies. Referring to FIG. 1, an aircraft 100 is shown, in accordance with various embodiments. Aircraft 100 may include a fuselage 102 having plurality of exit doors, including exit door 104. Aircraft 100 may include one or more evacuation assemblies positioned near a corresponding exit door. For example, aircraft 100 includes an evacuation assembly 106 positioned near exit door 104. Evacuation assembly 106 may be removably coupled to fuselage 102. In the event of an emergency, exit door 104 may be opened by a passenger or crew member of the aircraft 100. In various embodiments, evacuation assembly 106 may deploy in response to the exit door 104 being opened and, in various embodiments, evacuation assembly 106 may deploy in response to another action taken by a passenger or crew member such as pulling on a cable, depressing a button, or actuating a lever.

Figure 2:
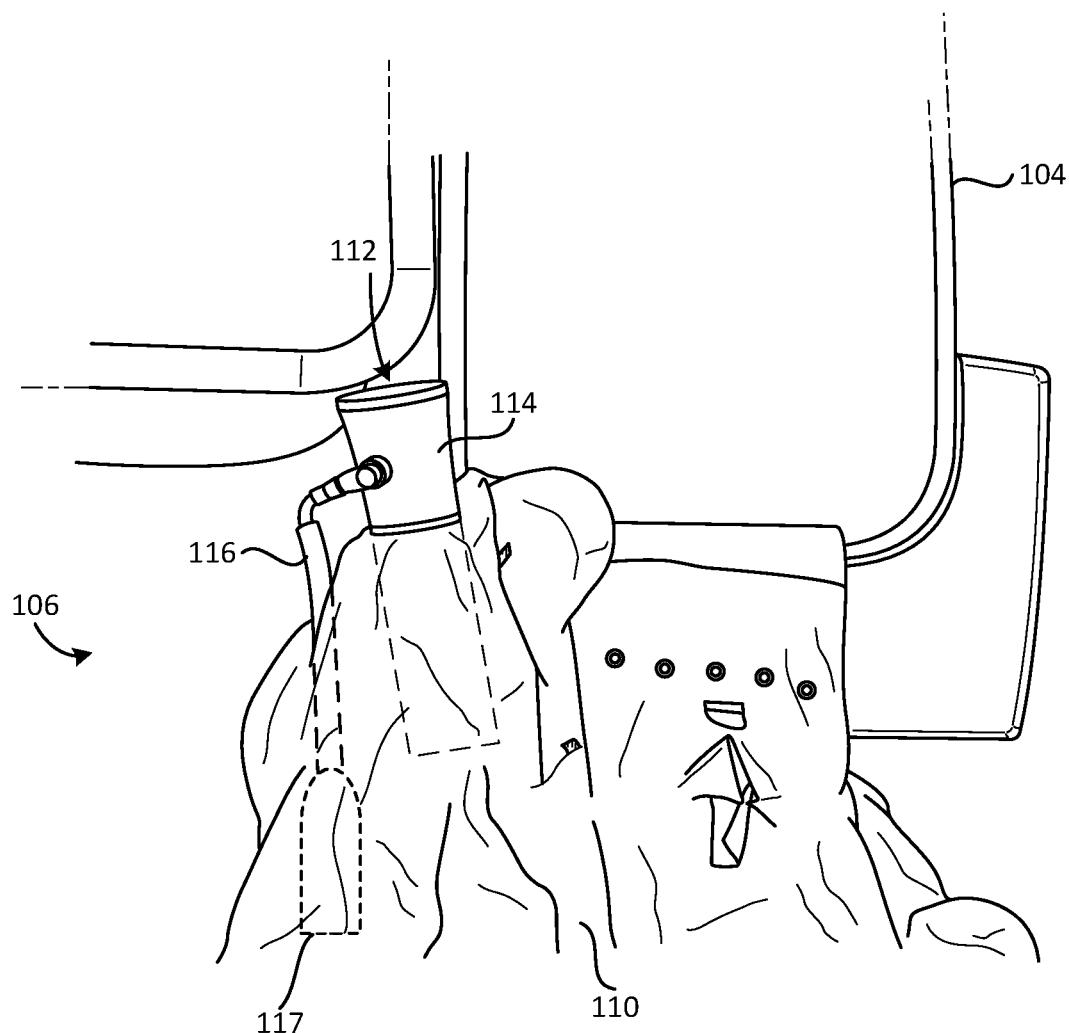
FIG. 2 illustrates a perspective view of an inflatable evacuation assembly, in accordance with various embodiments.

Referring to FIGS. 1 and 2, additional details of evacuation assembly 106 are illustrated, in accordance with various embodiments. In particular, evacuation assembly 106 includes an inflatable evacuation device 110. Evacuation assembly 106 further includes an aspirator 114 configured to entrain ambient air 112 into the inflatable evacuation device 110. The inflatable evacuation device 110 may be coupled to the fuselage 102 of FIG. 1, and may be decoupled from fuselage 102 in response to being fully inflated or manually detached to allow passengers and/or crew members to safely float away from aircraft 100 of FIG. 1 in the event of a water landing.

In various embodiments, the aspirator 114 is coupled to the inflatable evacuation device 110. The evacuation assembly 106 may further include a compressed fluid source (e.g., a charged tank, a fan, a blower, etc.) 117 that is coupled to the aspirator 114 via piping 116. During normal flight conditions, the inflatable evacuation device 110 may be deflated and stored within a compartment of aircraft 100. In various embodiments, inflatable evacuation device 110 and aspirator 114 may be stored in a single package within the aircraft compartment. In response to an emergency evacuation condition, fluid (e.g., gas) may flow into the aspirator 114 via piping 116 from the compressed fluid source 117 (e.g., a charged cylinder). This flow of fluid from the compressed fluid source 117 may cause aspirator 114 to draw and/or entrain ambient air 112 from the environment. The flow of fluid (e.g., gas) from the compressed fluid source 117 and the entrained flow of ambient air 112 may be directed into the inflatable evacuation device 110.

Figure 3:
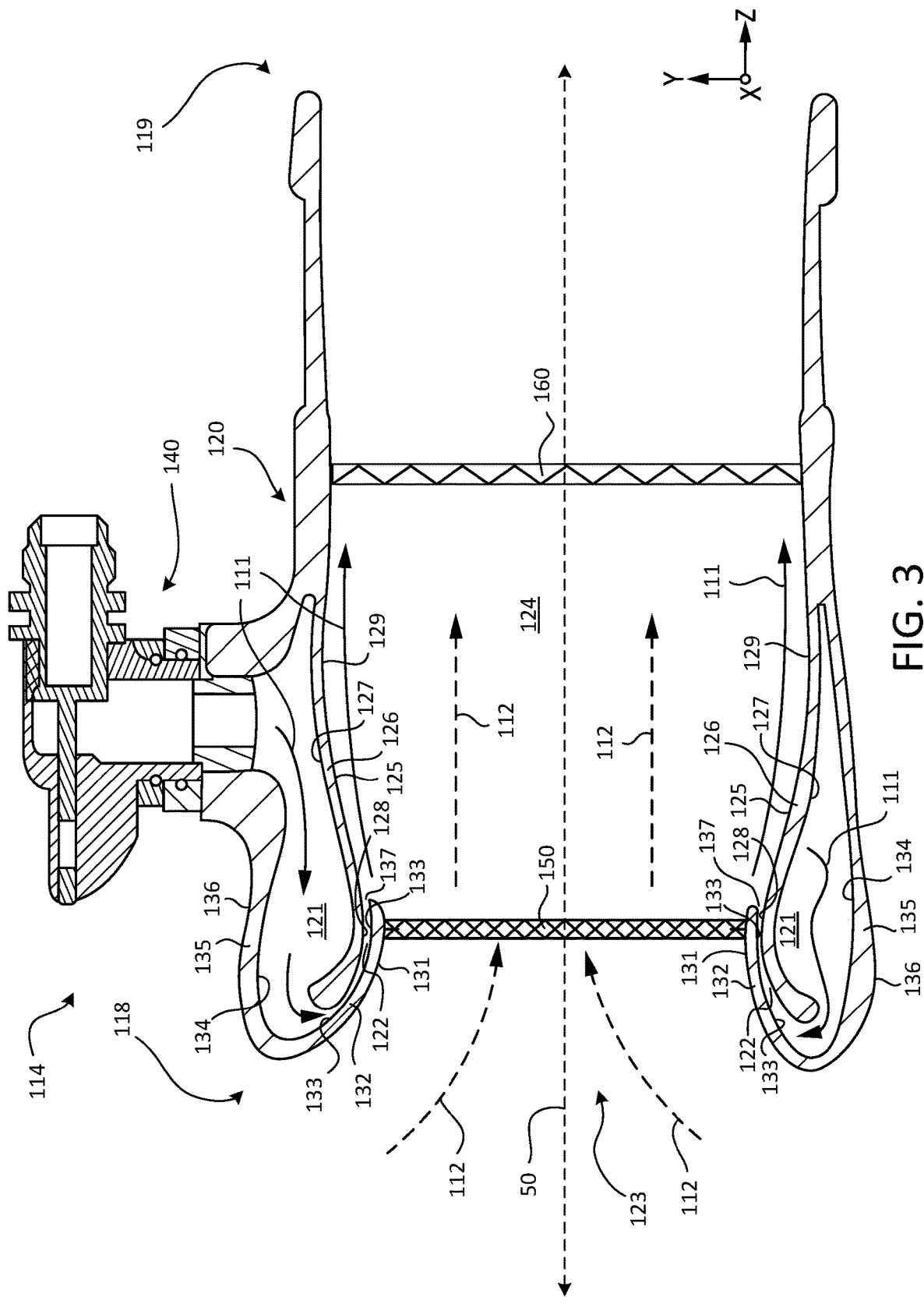
FIG. 3 illustrates a cross-sectional view of an aspirator, in accordance with various embodiments.

In various embodiments, and with reference to FIG. 3, structural details of the aspirator 114 are provided. In various embodiments, the aspirator 114 is configured to move ambient air 112 from a proximal end 118 of the aspirator 114 to a distal end 119 of the aspirator 114. As mentioned above, the aspirator 114 may be coupled to the inflatable evacuation device 110 such that the proximal end 118 is disposed outside the inflatable evacuation device 110 and the distal end 119 may be disposed within, or at least coupled in fluid providing communication with, the inside of the inflatable evacuation device 110.

The aspirator 114 disclosed herein, according to various embodiments, has various benefits over conventional aspirators. As evidenced by the description below, the aspirator 114 tends to efficiently entrains ambient air 112 and tends to precisely controls the flow direction of the entrained ambient air 112. In various embodiments, the aspirator 114 is configured to entrain between 10-15 times more ambient air 112, by volume, than fluid 111 from the compressed fluid source 117.

In various embodiments, it may be beneficial, for inflating an inflatable evacuation device 110, such as an evacuation slide, if the entrained air distributes across a width (e.g., horizontal dimension of the evacuation slide) of a portion of the evacuation slide near the aircraft in order to provide a proper support and/or to properly seat the evacuation slide against the aircraft before inflating the rest of the evacuation slide. In various embodiments, the aspirator 114 disclosed herein may be robust and/or compact, thus preventing the aspirator 114 from being damaged during an emergency evacuation event (i.e., during inflation/deployment of the inflatable evacuation device 110) and saving space in, for example, a tightly packed packboard compartment where the evacuation assembly is stored.

The aspirator 114, according to various embodiments, includes an aspirator body 120 that defines an annular cavity 121, an annular slit 122, and a central channel 124. Fluid communication between the annular cavity 121 and the central channel 124 is via the annular slit 122, according to various embodiments. In various embodiments, fluid communication between the annular cavity 121 and the central channel 124 is exclusively limited to the annular slit 122.

The aspirator 114 may also include a valve 140 that is configured to direct fluid 111 from the compressed fluid source 117 (shown schematically in FIG. 2) into the annular cavity 121. In various embodiments, fluid 111 (such as high-pressure gas) flows from the compressed fluid source 117, through the valve 140, and into the annular cavity 121. The fluid 111 can flow circumferentially within the annular cavity 121. In response to the fluid 111 exiting the annular cavity 121 via the annular slit 122, ambient air 112 from the environment surrounding the aspirator 114 is drawn, compelled, and/or entrained into the central channel 124 from outside the aspirator 114 due to the Venturi effect. Stated differently, aspirator 114 facilitates the intake of ambient air 112 from the environment, which enters the central channel 124 via an entrainment opening 123.

As illustrated, the flow direction of the ambient air 112 is generally in the positive z-direction on the provided xyz axes (e.g., from the proximal end 118 towards the distal end 119). Accordingly, as used herein, the term "distal" refers to the direction toward the positive z-direction on the provided xyz axes relative to aspirator 114 and the term "proximal"

refers to a direction toward the negative z-direction on the provided xyz axes relative to aspirator 114.

The aspirator 114, according to various embodiments, includes a longitudinal axis 50 that extends centrally from the proximal end 118 through the central channel 124 to the distal end 119. Accordingly, as used herein, a first component that is "radially outward" of a second component means that the first component is positioned at a greater distance away from the longitudinal axis 50 than the second component. For example, the term "radially inward surface" refers to a surface that generally faces inward towards the longitudinal axis 50 and is positioned generally closer to the longitudinal axis 50 than, for example, a "radially outward surface" of the same component.

As mentioned above, the ambient air 112 may flow into the central channel 124 via the entrainment opening 123. In various embodiments, the aspirator 114 may include a check-valve mechanism 150 or other suitable device, such as a flapper door mechanism, for limiting fluid flow to a desired direction (i.e., from the proximal end 118 to the distal end 119). The check-valve mechanism 150 may be mounted within the entrainment opening 123 and may be configured to allow the ambient air 112 to be entrained in response to the fluid 111 flowing into the central channel 124 via the annular slit 122 and prevent fluid flow from exiting the central channel 124 in response to the fluid 111 ceasing to flow (e.g., whether due to valve 140 actuation or depletion of the compressed fluid source 117). Accordingly, the check-valve mechanism 150 is configured to maintain the central channel 124 and thus the inflatable evacuation device 110 pressurized. In various embodiments, the check-valve mechanism 150 may be located in the position shown in the figures. In various embodiments, the check-valve mechanism 150 may be located in other locations along the longitudinal axis 50 of the aspirator body 120.

In various embodiments, the annular slit 122 is substantially disposed about/around the entrainment opening 123. Said differently, the annular slit 122 may be defined by the aspirator body 120 to circumscribe at least a portion of the entrainment opening 123. In various embodiments, an annular outlet 137 of the annular slit 122 is positioned distally relative to the check-valve mechanism 150. In various embodiments, the annular cavity 121 generally circumscribes the annular slit 122 and is thus disposed about/around the annular slit 122.

In various embodiments, the annular slit 122 may be a continuous annular opening (e.g., an uninterrupted opening) or the annular slit 122 may be cumulatively formed from a plurality of intermittent openings that are circumferentially spaced apart from each other and are disposed in an annular formation. In various embodiments, a radial dimension of the annular slit 122 is between about 0.010 inches (about 0.25 millimeters) and about 0.100 inches (about 2.54 millimeters). As used in this context, the term "about" refers to plus or minus 5%. In various embodiments, an angle of the fluid flowing out of the annular outlet 137 of the annular slit 122, relative to the longitudinal axis 50 of the aspirator 114, is between plus or minus 20 degrees.

In various embodiments, the aspirator body 120 includes an entrainment section 132 having a radially inward surface 131 and a radially outward surface 133. The radially inward surface 131 of the entrainment section 132 may face and define the entrainment opening 123. In various embodiments, entrainment section 132, and more specifically the radially inward surface 131 of the entrainment section 132, converges, in a direction from the proximal end 118 of the aspirator 114 to the distal end 119 of the aspirator 114, towards the longitudinal axis 50 of the aspirator 114. Said differently, the radially inward surface 131 of the entrainment section 132 may taper inwards in a direction from proximal end 118 to the distal end 119 of the aspirator 114 (e.g., a funnel shape). In various embodiments, the check-valve mechanism 150 is mounted and disposed in the narrowest portion of the entrainment opening 123.

In various embodiments, the radially outward surface 133 of the entrainment section 132 faces and at least partially defines the annular slit 122. That is, the radially outward surface 133 may form and define a radially inward border of the annular slit 122.

In various embodiments the aspirator body 120 also includes an outer cavity housing 135. The outer cavity housing 135 may have a radially inward surface 134 and a radially outward surface 136. The radially inward surface 134 of the outer cavity housing 135 may face and at least partially define the annular cavity 121. The outer cavity housing 135 may be coupled to or may be continuously unitary with the entrainment section 132. In various embodiments the entire aspirator body 120 is a single unitary structure made using, for example, an additive manufacturing method. Accordingly, the outer cavity housing 135 may transition to the entrainment section 132 such that the radially inward surface 134 of the outer cavity housing 135 transitions to and becomes the radially outward surface 133 of the entrainment section 132 and the radially outward surface 136 of the outer cavity housing 135 transitions to and becomes the radially inward surface 131 of the entrainment section 132.

In various embodiments, the aspirator body 120 includes a central channel housing 126. The central channel housing 126 may have a radially inward surface 125 and a radially outward surface 127. In various embodiments, a proximal portion 128 of the radially inward surface 125 of the central channel housing 126 faces and at least partially defines the annular slit 122. As mentioned above, the radially outward surface 133 of the entrainment section 132 may provide the radially inward border of the annular slit 122. In various embodiments, the proximal portion 128 of the radially inward surface 125 of the central channel housing 126 provides the radially outward border of the annular slit 122. Accordingly, in various embodiments, the fluid 111 from annular cavity 121 is configured to flow between, and is thus guided/directed by, the radially outward surface 133 of the entrainment section 132 of the aspirator body 120 and the proximal portion 128 of the radially inward surface 125 of the central channel housing 126.

In various embodiments, the proximal portion 128 of the radially inward surface 125 of the central channel housing 126 converges, in a direction from the proximal end 118 of the aspirator 114 to the distal end 119 of the aspirator 114, towards the longitudinal axis 50 of the aspirator 114. In various embodiments, the radially outward surface 133 of the entrainment section 132 also converges in a similar fashion.

In various embodiments, the distal portion 129 of the radially inward surface 125 of the central channel housing 126 faces and defines the central channel 124. In various embodiments, the distal portion 129 of the radially inward surface 125 of the central channel housing 126 diverges, in a direction from the proximal end 118 of the aspirator 114 to the distal end 119 of the aspirator 114, away from the longitudinal axis 50 of the aspirator 114. In various embodiments, the radially outward surface 127 of the central channel housing 126 faces and at least partially defines the annular cavity 121.

In various embodiments, the aspirator 114 further includes a flow straightener component 160. The flow straightener component 160 may be mounted to central channel housing 126 of the aspirator body 120 and may be disposed in the central channel 124. The flow straightener component 160 may be configured to straighten and/or direct the combined flow of fluid 111 and ambient air 112. The flow straightener component 160 may be positioned distally to provide structural support to the aspirator body 120 proximate the distal end 119. In various embodiments, the flow straightener component 160 has a honeycomb structure (or other suitable structure). The honeycomb structure may include cells that extend in a direction that is substantially parallel to the longitudinal axis 50 of the aspirator 114.

The aspirator body 120 may have a circular cross section or other cross section geometries, such as square, I-beam, or other hollow structure, according to various embodiments. In various embodiments, the components and sections of the aspirator body 120 are comprised of a lightweight, rigid material, such as aluminum, anodized aluminum, polyamide or other plastic, composite, or other suitable material. In various embodiments, the aspirator body 120 is formed by additive manufacturing, injection molding, composite fabrication, forging, casting, or other suitable process. As used herein, the term "additive manufacturing" encompasses any method or process whereby a three-dimensional object is produced by creation of a substrate or addition of material to an object, such as by addition of successive layers of a material to an object to produce a manufactured product having an increased mass or bulk at the end of the additive manufacturing process than the beginning of the process. A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, digital light processing, and cold spray. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, is intended to be included within the scope of the present disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aspirator configured to move air from a proximal end of the aspirator to a distal end of the aspirator, the aspirator comprising:

an aspirator body comprising an entrainment section, the aspirator body defining an annular cavity, a central channel, an annular slit, and an entrainment opening;
a check-valve mechanism configured to prevent flow from exiting the central channel in a direction opposite to a direction that ambient air is entrained through the aspirator body; and
a flow straightener component mounted to the aspirator body and disposed in the central channel distally relative to the check-valve mechanism and the annular slit wherein:
the annular slit circumscribes and is substantially disposed about the entrainment opening;
the annular cavity circumscribes and is substantially disposed about the annular slit;
fluid communication between the annular cavity and the central channel is via the annular slit, the aspirator being configured to entrain ambient air into the central channel via the entrainment opening in response to gas flowing from the annular cavity through the annular slit and into the central channel;
the entrainment section comprises a first radially inward surface that faces and defines the entrainment opening;
the entrainment section comprises a radially outward surface that faces and at least partially defines the annular slit;
the check-valve mechanism extends across the entrainment opening and is disposed in the entrainment opening between the first radially inward surface of the entrainment section;
the aspirator body comprises a central channel housing having a second radially inward surface;
a proximal portion of the second radially inward surface of the central channel housing faces and at least partially defines the annular slit and a distal portion of the second radially inward surface of the central channel housing faces and defines the central channel; and
the distal portion of the second radially inward surface of the central channel housing immediately downstream of the annular slit diverges, in a direction from the proximal end of the aspirator to the distal end of the aspirator, away from a longitudinal axis of the aspirator.

2. An evacuation assembly of an aircraft, the evacuation assembly comprising:
a compressed fluid source;
an inflatable evacuation device;
an aspirator comprising an aspirator body, wherein the aspirator body defines an annular cavity, a central channel, and an annular slit, wherein fluid communication between the annular cavity and the central channel is via the annular slit; and
a flow straightener component mounted to the aspirator body and disposed in the central channel distally relative to the annular slit wherein:
the aspirator is coupled in fluid receiving communication with the compressed fluid source;
the inflatable evacuation device is coupled in fluid receiving communication with the aspirator; and
a radially inward surface of the aspirator body immediately downstream of the annular slit diverges, in a direction from a proximal end of the aspirator to a distal end of the aspirator, away from a longitudinal axis of the aspirator.

3. The aspirator of claim 1, wherein the check-valve mechanism is mounted to the radially inward surface of the entrainment section and is disposed in the narrowest portion of the entrainment opening.

* * * * *